Aug. 19, 1969   J. W. ENDRESS   3,462,625
ROTOR COOLING ARRANGEMENT
Filed Feb. 21, 1966

*INVENTOR.*
JAMES W. ENDRESS.
BY Raymond Curtin
ATTORNEY.

… … …

United States Patent Office 3,462,625
Patented Aug. 19, 1969

3,462,625
ROTOR COOLING ARRANGEMENT
James W. Endress, Syracuse, N.Y., assignor to Carrier Corporation, Syracuse, N.Y., a corporation of Delaware
Filed Feb. 21, 1966, Ser. No. 528,733
Int. Cl. H02k 9/02, 1/32
U.S. Cl. 310—61       1 Claim

ABSTRACT OF THE DISCLOSURE

A dynamoelectric machine employing a rotor having axial and radial passages therein for passing a cooling medium therethrough, the radial passages communicating with a selected number of axial passages to provide a balanced distribution of cooling medium throughout the rotor and around the armature bars or windings.

---

This invention relates to the cooling of dynamoelectric machines. More particularly, this invention relates to a dynamoelectric machine incorporating novel cooling means. Still more particularly, this invention relates to dynamoelectric machines having a novel rotor construction therein for improved circulation of cooling medium through the rotor and gap.

In many dynamoelectric machines, it is desirable to provide passages therein for circulating air or a coolant such as liquid or gaseous refrigerant to maintain the temperature of the machine within a safe operating range. One of the problems encountered in a machine of this type is excessive cooling in the vicinity of the passages and insufficient cooling elsewhere in the machine.

It is, therefore, the chief object of this invention to provide an improved dynamoelectric machine rotor having provisions therein for rotor cooling. It is a further object of this invention to provide a rotor having cooling passages therein to provide the proper amount of cooling medium to each section of the rotor. It is another object of this invention to provide a rotor having means therein for improved cooling of the rotor bars to permit higher resistance bars in the rotor to effectively increase the slip of an induction motor incorporating the rotor for applications where this would be advantageous. It is a still further object of this invention to provide a novel method for cooling a dynamoelectric machine.

These objects are attained by providing a plurality of axial passages through the rotor laminations of a dynamoelectric machine. Novel vent laminations are provided at spaced intervals along the axis of the rotor to conduct cooling medium from the axial cooling passages to the rotor bars disposed about the periphery of the laminations and the gap between the rotor and stator of the machine. The vent laminations have a plurality of holes therein for alignment with the axial passages in the rotor laminations. The vent laminations also have a number of radial slots therein communicating at one end with the holes in the laminations and open at the peripheral end thereof. The number of radial slots in each lamination is less than the number of holes therein so that only the cooling medium from a selected number of axial passages will flow to the rotor bars and gap at each vent lamination.

Other objects and features of this invention will be apparent upon a consideration of the ensuing specification and drawing in which.

Figure 1:
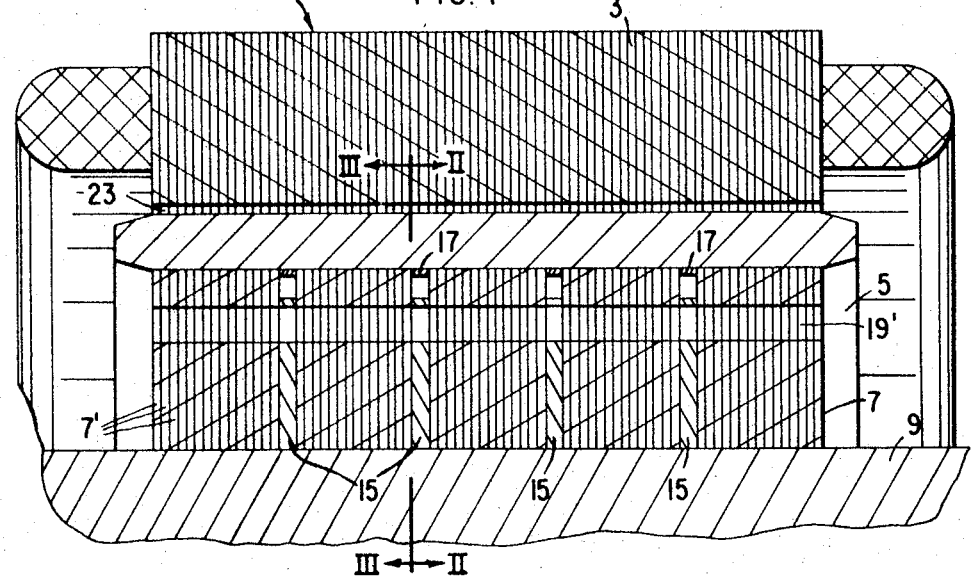
FIGURE 1 is a sectional elevational view of a portion of a dynamoelectric machine.
Figure 2:
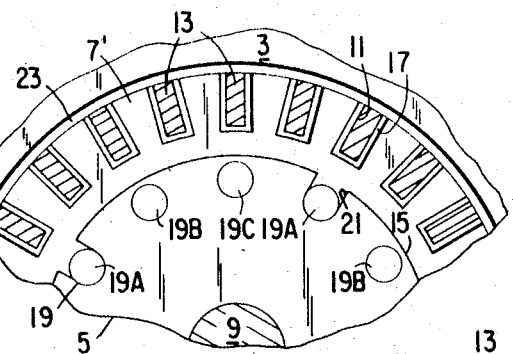
FIGURE 2 is a view of the rotor taken along lines II—II of FIGURE 1.
Figure 3:
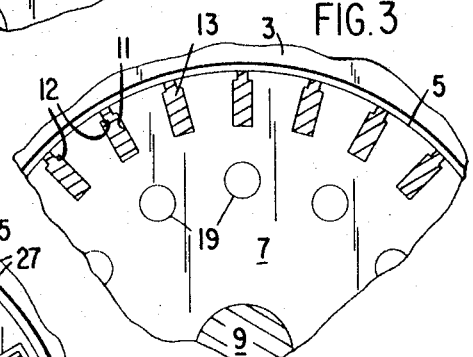
FIGURE 3 is a view of the rotor taken along lines III—III of FIGURE 1.

Referring more particularly to FIGURES 1, 2, and 3 of the drawing, there is shown a portion of a dynamoelectric machine 1 having a stator 3 and a rotor 5. It is to be understood that the dynamoelectric machine also encompasses a frame, casing, bearings, etc., which are not shown as they form no part of my invention. The rotor 5 is composed of a laminated core 7 mounted on shaft 9. The laminations 7' of the rotor 5 have slots 11 therein for receiving armature bars 13. As can be seen from FIGURE 3, the slots 11 in the laminations 7' have a shoulder 12 therein to maintain the armature bars 13 in the rotor 5. It is to be understood that armature windings could be mounted in the slots 11 in place of the bars 13. Vent laminations 15 are provided in the laminated core 7 at spaced intervals. Spacers 17 are provided around bars 13 between the laminations separated by a vent lamination to maintain proper spacing of the periphery of the laminations. If the bars 13 are to be cast into the laminated core 7, these spacers will also act as a mold portion to prevent molten metal from flowing into the vent lamination spaces.

Axial passages 19' in the core laminations 7 and laminations 15 are formed by aligned holes 19 to provide a cooling medium passage through the rotor. Cooling medium is provided to the rotor by any well-known expedient such as disclosed in Patent No. 3,146,605, issued on Sept. 1, 1964, to S. J. Rachfal et al. Slots 21 in the vent laminations 15 communicating with certain of the vent lamination holes 19 provide a passage for the radial flow of cooling medium to the bars 13 and rotor-stator 23. It should be noted that slots 21 are only provided for a selected number of holes 19. For purposes of illustration only, I have shown a slot for every third hole. The slots in each vent lamination communicate with different holes 19. Thus the slots in one vent lamination would communicate with holes 19A, the slots in the next vent lamination would communicate with holes 19B, the slots in the next vent lamination would communicate with holes 19C, etc. By utilizing this arrangement, an even distribution of cooling medium throughout the dynamoelectric machine can be obtained.

Figure 4:
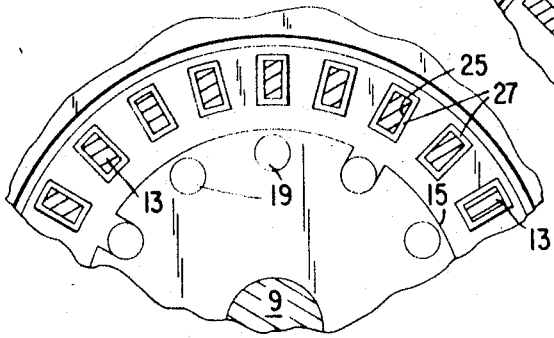
FIGURE 4 is a view similar to FIGURE 2 showing a second embodiment of my invention.

FIGURE 4, illustrating a second embodiment of my invention, illustrates a rotor having closed slots 25 for bars 13. In this embodiment, the spacers 27 completely surround the bars 13 rather than just three sides as do spacers 17 in FIGURE 2. The vent laminations, however, are identical in both embodiments.

While I have illustrated vent laminations 15 for purposes of explaining my invention, I do not intend to limit my invention thereto but to cover any rotor construction which would employ a system of selective radial vents supplied by a plurality of axial passages.

While I have described the preferred embodiments of my invention, it is to be understood that the invention is not limited thereto since it may be otherwise embodied within the scope of the following claim.

I claim:
1. A dynamoelectric machine comprising:
a stator member, a rotor member having a laminated rotor core including a plurality of vent laminations disposed within said core at spaced intervals, said rotor core and said vent laminations having a plurality of aligned axial passages therethrough, adjacent vent laminations having nonaligned radial slots therein communicating between the periphery of said rotor and a portion of the axial passages.

References Cited
FOREIGN PATENTS
868,467  5/1961  Great Britain.

WARREN E. RAY, Primary Examiner
R. SKUDY, Assistant Examiner